United States Patent [19]

de Leeuw et al.

[11] Patent Number: 4,931,312

[45] Date of Patent: Jun. 5, 1990

[54] SOL-GEL PROCESS FOR PRODUCING LIMINESCENT THIN FILM, AND FILM SO PRODUCED AND DEVICES UTILIZING SAME

[75] Inventors: Dagobert M. de Leeuw, White Plains; Walter K. Zwicker, Scarborough; Rameshwar N. Bhargava, Ossining, all of N.Y.

[73] Assignee: North American Philips Corporation, New York, N.Y.

[21] Appl. No.: 262,244

[22] Filed: Oct. 20, 1988

Related U.S. Application Data

[63] Continuation of Ser. No. 812,219, Feb. 10, 1986, abandoned.

[51] Int. Cl.$^5$ .............................................. B05D 5/06
[52] U.S. Cl. .................................... 427/64; 427/157; 427/248.1; 427/255; 427/343; 427/344; 427/377
[58] Field of Search ............... 427/64, 255, 248.1, 427/343, 344, 377; 428/690; 264/66; 501/12

[56] References Cited

U.S. PATENT DOCUMENTS

| | | | |
|---|---|---|---|
| 3,927,224 | 12/1975 | Levene | 427/64 |
| 4,271,210 | 6/1981 | Yoldas | 427/169 |
| 4,278,632 | 7/1981 | Yoldas | 264/66 |
| 4,419,115 | 12/1983 | Johnson et al. | 65/3 |
| 4,420,517 | 12/1983 | Ali | 427/2 |
| 4,472,510 | 9/1984 | January | 501/12 |
| 4,551,397 | 11/1985 | Yaguchi et al. | 428/690 X |

FOREIGN PATENT DOCUMENTS 138291 8/1984 Japan .

Primary Examiner—Janyce Bell
Attorney, Agent, or Firm—John C. Fox

[57] ABSTRACT

Luminescent thin films are produced by a sol-gel process in which a gellable liquid is applied to a substrate to form a thin film, gelled and heated to remove volatile constituents and form a polycrystalline luminescent material.

2 Claims, 2 Drawing Sheets

SOL-GEL PROCESS FOR PRODUCING LIMINESCENT THIN FILM, AND FILM SO PRODUCED AND DEVICES UTILIZING SAME

This is a continuation of application Ser. No. 812,219, filed Feb. 10, 1986 now abandoned.

BACKGROUND OF THE INVENTION

This invention relates to a sol-gel process for producing thin films of luminescent material, and to the thin films so produced. More particularly, the invention relates to a sol-gel process in which a non-luminescent gelled film may be converted to a polycrystalline luminescent film by heating below the firing temperature used for conventional powder phosphors.

Recent increasing interest in high brightness, small cathode ray tubes (CRTs) for projection type displays has generated new and more stringent demands for the phosphor coatings, including higher resolution (for large screen displays), and higher thermal stability to withstand required high electron beam excitation densities.

Conventional powder phosphor layers show limited resolution due to light scattering and reflection from the particles. In addition, such layers show very poor thermal conductivity, due in most part to their porosities caused by the relatively small contact areas between particles. Thus, such layers are unable to easily dissipate the heat generated by high electron beam excitation densities.

Single crystal layers, on the other hand, have excellent thermal conductivities due to their lack of porosity, but because of the lack of grain boundaries or other light scattering sources, can have up to 80 percent of their luminescence trapped due to multiple internal reflections between the layer surfaces.

An attractive compromise between a particulate powder layer and a single crystal layer might be offered by a relatively dense polycrystalline layer. Not only would it have excellent thermal conductivity, but it would have little or no light trapping through internal reflections.

However, the production of dense, polycrystalline luminescent layers by known techniques such as sputtering, plasma spraying and chemical vapor deposition, is difficult to achieve in practice, requiring complex equipment and careful control of process parameters. In addition, the choice of materials suitable for use with these various techniques is fairly limited. See, for example, Studer et al., J. Opt. Soc. Am., vol. 45, no. 7, July, 1955, p. 493; and U.S. Pat. No. 3,961,182.

Several investigators have formed luminescent layers by spraying a solution of the constituents onto a heated substrate to form a film, and then heating the film to promote or enhance crystallization. For example, cathodoluminescent films have been formed by this technique by Gilliland et al., Electrochemical Technology, vol. 5, no. 5/6, 1967, p. 303.

The density and adhesion of such a layer has recently been improved by closely controlling the size of the particles brought into contact with the substrate. See European Patent Specification 0 003 148. However, the brightness of such a layer is not as high as would be desired for the most demanding applications, such as projection TV.

Various techniques have been disclosed for producing mixed oxide ceramics and glasses using sols and or gels. For example, in British patent 1,266,494, mixed oxide microspheres are formed by dispersing an aqueous metal salt solution in a non-miscible organic liquid, and adding a base to induce gelling of the dispersed aqueous phase by hydrolysis. The gelled particles are then separated from the organic phase and heated to effect solid state reaction.

In U.S. Pat. No. 4,278,632, silica-titania binary glasses are formed on a substrate by: first partially hydrolyzing one metal alkoxide by adding water to a dilute organic solution of the alkoxide; then reacting this solution with another metal alkoxide solution to polymerize the reactants; then coating the solution on a substrate; drying the coating; and heating the coating at a temperature of about 400 to 1000 degrees C. to convert the coating to a glass. Similar techniques for glass formation are disclosed in U.S. Pat. Nos. 4,472,510; 4,420,517 and 4,419,115. However, none of these patents suggests that their processes can be used to make luminescent materials.

It is an object of the present invention to readily produce dense, polycrystalline luminescent thin films from a variety of luminescent materials.

It is another object of the invention to produce such luminescent thin films without the need for complex equipment.

SUMMARY OF THE INVENTION

In accordance with the invention, there is provided a sol-gel process for producing a thin film of luminescent material on a substrate, the process comprising:
(a) applying a gellable liquid on a substrate to form a thin film, the liquid comprising:
  (1) at least a portion of the constituents or precursors of the constituents of the luminescent material in the proportions required to form the desired luminescent material composition; and
  (2) at least one liquid vehicle; the constituents or precursors being present in the vehicle in solution or in colloidal suspension, or partly in solution and partly in colloidal suspension;
(b) gelling the film; and
(c) heating the gelled film below the firing temperature used for conventional powder phosphors to decompose the precursors into von-volatile constituents and volatile components, to remove the volatile components, and to convert the non-volatile, non-luminescent constituents into a dense, polycrystalline luminescent thin film.

In a preferred embodiment, the gellable liquid is formed by first dissolving at least one metal alkoxide precursor in a water-miscible non-polar solvent, and then adding sufficient water to at least partially hydrolyze the alkoxide without gelling the solution.

In another embodiment, the gellable liquid is formed by precipitating at least one metal hydroxide from aqueous solution, washing the precipitate, and suspending the precipitate in the vehicle.

In another embodiment, the luminescent composition is formed in situ by heating the gelled film in an atmosphere containing a vapor of one of the constituents.

DESCRIPTION OF THE PREFERRED EMBODIMENTS

Gel Coating from Alkoxides

Figure 1:
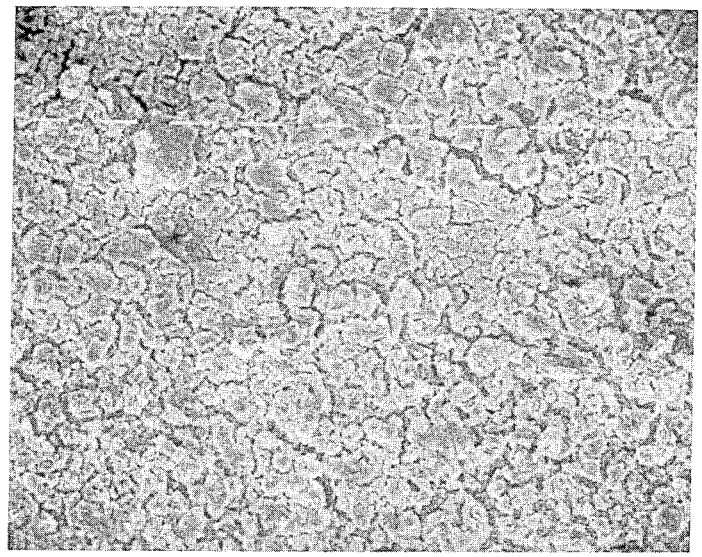
FIG. 1 is a scanning electron photomicrograph showing a typical luminescent thin film of the invention.

In a preferred embodiment of the invention, at least one of the constituents of an oxygen-containing phosphor is introduced into the gellable liquid in the form of an alkoxide. An alkoxide is an alkyl- compound in which the H of the hydroxyl group is replaced by another positive ion such as a metal. Simple examples of alkoxides are the alcoholates, such as the ethylates. A single multivalent replacement ion can take on multiple alkoxy-radicals, such as in tetraethylorthosilicate. Other alkoxides which can be produced from multivalent cations include, for example, aluminates, titanates, vanadates, zirconates, and niobates.

In addition to being soluble in a non-polar solvent (an organic solvent such as an aliphatic or aromatic alcohol), these alkoxides are thermally decomposable to yield the positive ion, oxygen, and a volatile component. Soluble compounds which are capable of thermal decomposition into the constituents and volatile components are referred to herein generally as "precursors".

It is preferred to add as many constituents as possible in the form of alkoxides, because this form is thought to promote the formation of cation-oxygen bonding. However, many constituents are not readily available in the form of alkoxides, and for the sake of convenience at least some of these may be introduced in the form of other precursor compounds. Examples of such compounds are acetates, halides, and nitrates.

It is stressed, however, that at least one of the constituents must be introduced as an alkoxide. This is necessary because in order to render the solution of precursor compounds gellable, it must be activated by the addition of water to promote the partial hydrolysis of the alkoxides.

An excess of water over the stoichiometric amount for hydrolysis will insure against incomplete reaction, which would result in the loss through volatilization of the unreacted constituents upon heating. From 2 to 4 times the stoichiometric amount is preferably added, above which the solution will tend to gel spontaneously in bulk, prior to the formation of a thin film.

In order to maintain close control over the amount of water present and also over the time when hydrolysis is initiated, it is preferred to remove any water of hydration from the precursor compounds prior to their addition to the organic solvent. As is known, this can be accomplished simply by heating.

Hydrolysis will take place at ambient temperatures, but as is known, refluxing at moderate temperatures up to the boiling point of the solution will accelerate the reaction appreciably. In addition, it is known to catalyze the reaction with H+ ions, for example, by the addition of a few drops of a strong acid although such is not necessary to achieve hydrolysis. OH− ions can also catalyze the reaction, but care must be taken to prevent unintended precipitation of the one or more of the solutes.

The resulting activated solution is generally clear and quite stable, having an indefinite shelf life so long as the loss of solvent and water is prevented. However, upon coating a substrate with the solution to form a film, as the solvent and water evaporate, the film will begin to gel, and, typically within a few minutes to an hour, dries to a clear, non-tacky gelled state.

GEL COATING FROM HYDROXIDES

In another embodiment of the invention, at least one of the constituents of an oxygen-containing phosphor is introduced into the gellable liquid in the form of a hydroxide. For example, aqueous-soluble compounds of two or more positive ion constituents are dissolved in water, and then the hydroxides of these positive ions are co-precipitated by the addition of a base such as ammonium hydroxide to the solution.

The precipitate is then recovered by centrifuging, decanting the supernatant liquid, and washing one or more times to remove soluble residue. The washed precipitate is then introduced into a non-solvent liquid vehicle, such as water, and agitated to form a sol, ie, a finely divided colloidal suspension of the precipitate particles in the vehicle.

The sol is generally milky in appearance, and is fairly stable, having a shelf life of up to several weeks. If the particles have begun to settle, they may be resuspended by simple agitation prior to use.

Upon coating a substrate with the sol prepared as above, the vehicle evaporates, leaving a gelled film.

CONVERSION TO PHOSPHOR

The coating may be applied to the substrate by any convenient means, such as brushing, rolling, dipping, spinning, spraying or simply dropping the gellable liquid onto the substrate and allowing it to spread. The method of application will depend somewhat on the viscosity of the gellable liquid and the coating thickness required.

It is generally preferred to allow the coating to air dry at room temperature, since forced drying, such as by increasing the temperature or moving the air, or both, risks the introduction of microcracks into the coating. However, the occurrence of a few such microcracks in a single coating appears to be tolerable, particularly where up to several coatings are applied to the substrate in order to build up the overall thickness of the phosphor layer. Accordingly, accelerated drying at up to about 300 degrees C. is permissible.

In the gelled state, the coatings are not usually luminescent. They must generally be converted to a crystalline state by heating in order to achieve luminescence. It is a particular advantage of the invention that such conversion may be achieved at temperatures appreciably below (for example, 200 to 300 degrees below) the firing temperatures typically needed to achieve solid state reaction of powder phosphor constituents. This advantage is believed to derive from the intimate relationship between the phosphor constituents in the gelled state. Particularly in the case of the alkoxide precursors, it is known that hydrolysis initiates a polymerization reaction in which positive ion-oxygen-positive ion bonds are formed. Such bonding is postulated to reduce the energy needed to achieve the crystal structure required for luminescence.

For certain desired phosphor compositions, particularly mixed anion phosphors such as the oxyhalides, oxysulfides and oxynitrides, it may not be convenient or possible to introduce the second anion into the gellable liquid. In such cases, it is possible to form the desired composition in situ by heating the gelled coating in the presence of a gaseous reactant containing the anion.

The density of the crystallized film can be influenced to some extent by the size of the colloidal particles in the sol, and also the heating conditions-smaller particles, higher temperatures and longer times in general leading to higher densities. The particle size may be varied by varying the conditions of precipitation as is known.

EXAMPLES

All starting materials used were at least five nines pure, unless otherwise noted.

EXAMPLE 1

$Zn_2SiO_4$:Mn Green Phosphor

Zinc acetate and manganese acetate, were heated to remove their water of hydration. The zinc acetate and manganese acetate in the amount of 1 mole percent of manganese to zinc, were dissolved in a 10:1 molar ratio of ethanol to zinc acetate. Nitric acid was then added to the solution in an amount sufficient to reduce the pH to about 2. Tetraethylorthosilicate (TEOS) was then added to the solution in a 1:2 molar ratio of silicon to zinc. Water was then added in a 4:1 molar ratio of water to TEOS. The solution was then refluxed at the boiling point of the solution for about 7 hours.

The resultant clear solution was allowed to cool and then a few drops were spread onto a quartz substrate and allowed to air dry for about 5 minutes to form a clear, non-tacky gelled film about 0.5 microns thick. It was then heated at about 1000 degrees C. for about 2 hours. Additional layers were added to build up the thickness to about 15 microns. Each layer was heated under the same conditions as the previous layer to achieve a dense, polycrystalline luminescent film which luminesced green upon both UV and cathode ray excitation.

FIG. 1 is a scanning electron micrograph, taken at a magnification of 600 times, of a layer of a $Zn_2SiO_4$:Mn luminescent film formed by the above technique. Cracks visible in the layer are advantageous in that they prevent multiple internal reflections, and are largely covered over by subsequently applied layers.

Figure 2:
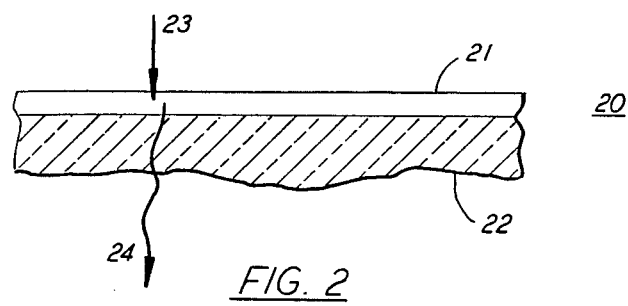
FIG. 2 is a section view of a luminescent thin film of the invention on a supporting substrate.

FIG. 2 is a section view of a luminescent structure 20 including a luminescent thin film 21 of the invention on a transparent supporting substrate 22, such as glass or quartz.

EXAMPLE 2

$Zn_2SiO_4$l:Mn Green Phosphor

Several samples of $Zn_2SiO_4$:Mn phosphor were prepared according to the procedure of Example 1, except that the substrate was glass and the heating temperature was 600 degrees C. instead of 1000 degrees C. Heating time was varied from about 2 minutes to about 12 hours, and green luminescence under cathode ray excitation was observed to increase in intensity with increasing heating time.

EXAMPLE 3

$Y_2SiO_5$:Tb Green Phosphor

The procedure of Example 1 was followed except that yttrium was substituted for zinc and terbium was substituted for manganese in the amount of 5 mole percent terbium to yttrium. The phosphor film luminesced green upon UV excitation.

EXAMPLE 4

$Y_2SiO_5$:Ce Blue Phosphor

The procedure of Example 3 was followed except that cerium was substituted for terbium. The phosphor luminesced blue upon UV excitation.

EXAMPLE 5

$Y_2O_3$:Eu Red Phosphor

To a 0.2 molar solution of yttrium nitrate was added europium nitrate in the amount of about 5 mole percent europium to yttrium. The resultant solution was stirred into a beaker containing a 20:1 molar excess of ammonium hydroxide solution at room temperature to co-precipitate yttrium and europium hydroxides. The co-precipitate was centrifuged, and washed several times to remove residual ammonia, leaving a damp paste. This paste was agitated to form a sol. This sol was then sprayed onto a quartz substrate and allowed to dry to a gelled film about 0.2 to 0.5 microns thick. Additional layers were added to achieve a multilayer film having a thickness of about 10 microns. The film was then heated in air at about 1000 degrees C. for about 2 hours to convert it to a dense, polycrystalline film which luminesced red upon both UV and cathode ray excitation.

EXAMPLE 6

$Y_2O_3$:Eu Red Phosphor

Several samples of $Y_2O_3$:Eu red phosphor were prepared according to the procedure of Example 5, except that the substrate was glass and heating was carried out at 600 degrees C. instead of 1000 degrees C. Heating time was varied from about 2 minutes to 12 hours, and the intensity of red luminescence under cathode ray excitation was observed to increase with increasing heating time.

EXAMPLE 7

$La_2O_3$:Tb Green Phosphor

The procedure of Example 5 was followed, except that lanthanum was substituted for yttrium and terbium was substituted for europium. The phosphor film luminesced green upon UV excitation.

EXAMPLE 8

$La_2O_3Br$:Tb Green Phosphor

The procedure of Example 5 was repeated, except that after heating the film to convert it to lanthanum oxide, the film was again heated, this time in a bromine-containing nitrogen atmosphere at about 1000 degrees C. for about 2 hours to convert the film to lanthanum oxybromide. Such a phosphor film is extremely difficult to achieve by other techniques, due to its hygroscopic nature. The film luminesced green under UV excitation.

The invention has so far been described in terms of heating the film and a substrate to achieve luminescence. However, the heating temperature needed may exceed the softening point of commercially desirable substrates, such as the glass face panel of cathode ray tubes. In such cases, it is possible to achieve localized heating of the film without elevating the substrate to its softening point, such as by the use of microwave, laser, or infrared heating. In the alternative, a combination of furnace heating the coated substrate to below the softening point and locally heating the coating to the desired temperature by one of the above techniques may be used.

The invention has also been described in terms of a layer of a single luminescent material on a supporting substrate, which layer may or may not be built up from a plurality of coatings. However, as will be appreciated by those skilled in the art, multilayer devices are known which utilize two or more layers of different luminescent compositions. For example, in the CRT field, both high voltage CRTs such as color picture tubes, and low voltage devices such as vacuum fluorescent displays (VFDs), can incorporate two or more luminescent layers of different colors and/or persistences, which layers are selectively excited, for example, by varying the voltage or current. Where such selective excitation is achieved by varying the voltage to vary the penetration distance of the electron beams into the multilayer structure, the device is known as a penetron tube.

Figure 3:
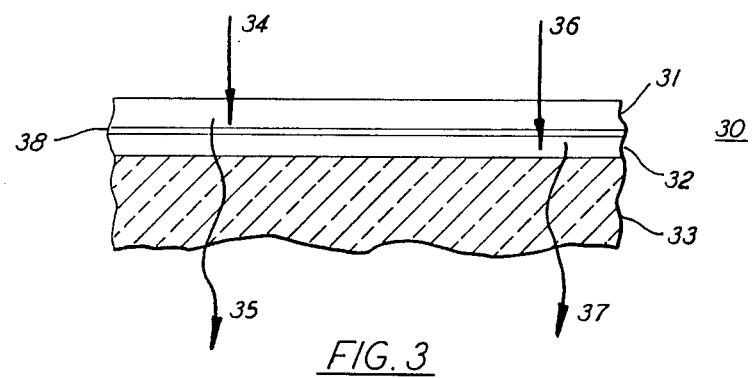
FIG. 3 is a section view of a multilayer structure comprising two luminescent thin films of the invention on a supporting substrate.

Such a device 30 is shown in FIG. 3, where luminescent layers 31 and 32 are supported by substrate 33 of glass or other transparent material. In operation, electron beam 34 at one potential penetrates only to the first layer, producing a characteristic luminescence 35, whereas beam 36 at a second, higher potential penetrates to the second layer, producing a second characteristic luminescence 37. Neutral layer 38 tends to create a threshold level for excitation of the second layer, thus promoting color purity of the device.

In order to insure that the electron beam is able to penetrate layer 31, the layer should generally not be more than about 1 micrometer thick. A particular advantage of the process of the invention is that relatively uniform layers of such thickness are readily achieved.

Figure 4:
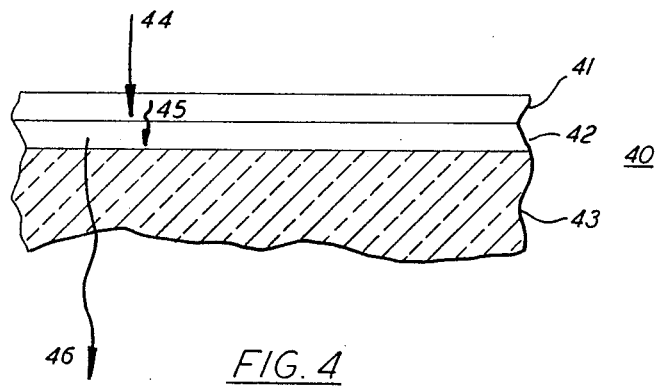
FIG. 4 is a section view of another multilayer structure comprising two luminescent thin films of the invention on a supporting substrate.

Another multilayer CRT device 40 is shown in FIG. 4. In this device, luminescent layers 41 and 42, supported by transparent substrate 43, have different excitation and emission characteristics. Such a device enables the use of a luminescent material (in layer 42) which has desirable emission characteristics, but which is unsuitable for excitation by an electron beam. For example, such a material may exhibit excessive degradation under electron bombardment. Such material is thus excited indirectly by radiative transfer 45 from layer 41, which is excited by electron beam 44. Emission 46 results.

Segmented luminescent screens, such as the striped screens used in shadow mask and beam index color tubes, can also be produced by the method of the invention. For example, a pattern of seperate lands of gellable liquid may be disposed on a substrate through a removeable mask in contact with the substrate, and the array processed as described above. Other variations will become apparent to those skilled in the art.

We claim:

1. A sol-gel process for producing a thin film of luminescent material on a substrate, the process comprising:
    (a) forming a gellable liquid by first dissolving at least one metal alkoxide precursor of at least one constituent of the luminescent material in a water-miscible non-polar solvent, and adding sufficient water to at least partially hydrolize the alkoxide without gelling the solution;
    (b) applying the gellable liquid to a substrate to form a thin film;
    (c) gelling the film by allowing the film to air dry; and
    (d) heating the gelled film to decompose precursors into non-volatile constituents and volatile components, to remove the volatile components, and to convert the non-volatile, non-luminescent constituents into a luminescent material, the heating being carried out in an atmosphere containing a gaseous reactant in order to promote incorporation of the reactant which is ion forming into the luminescent material.

2. A sol-gel process for producing a thin film of luminescent material on a substrate, the process comprising:
    (a) forming a gellable liquid by suspending in the liquid a co-precipitate of at least two metal hydroxide prescursors of at least two constituents of the luminescent material in the proportion required to form the luminescent material;
    (b) applying the gellable liquid to a substrate to form a thin film;
    (c) gelling the film by allowing the film to air dry; and
    (d) heating the gelled film to decompose the precursors into non-volatile constituents and volatile components, to remove the volatile components, and to convert the non-volatile, non-luminescent constituents into a luminescent material, the heating being carried out in an atmosphere containing a gaseous reactant which is ion forming in order to promote incorporation of the reactant into the luminescent material.

* * * * *